United States Patent
Nania et al.

(10) Patent No.: US 10,563,448 B2
(45) Date of Patent: Feb. 18, 2020

(54) APPROACH ACTIVATED CLOSURE ENTRY SYSTEM FOR A MOTOR VEHICLE

(71) Applicant: FORD GLOBAL TECHNOLOGIES, LLC, Dearborn, MI (US)

(72) Inventors: Adrian Nania, Rochester, MI (US); Howard Paul Tsvi Linden, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 390 days.

(21) Appl. No.: 14/936,824

(22) Filed: Nov. 10, 2015

(65) Prior Publication Data
US 2017/0130510 A1    May 11, 2017

(51) Int. Cl.
| | |
|---|---|
| *E05F 15/74* | (2015.01) |
| *B62D 33/027* | (2006.01) |
| *E05B 81/04* | (2014.01) |
| *E05B 81/78* | (2014.01) |
| *G06K 9/00* | (2006.01) |
| *E05F 15/73* | (2015.01) |

(52) U.S. Cl.
CPC .......... *E05F 15/74* (2015.01); *B62D 33/027* (2013.01); *B62D 33/0273* (2013.01); *E05B 81/04* (2013.01); *E05B 81/78* (2013.01); *G06K 9/00362* (2013.01); *G06K 9/00791* (2013.01); *E05F 15/73* (2015.01); *E05F 2015/767* (2015.01); *E05Y 2900/531* (2013.01)

(58) Field of Classification Search
CPC ...... E05F 15/74; E05F 15/76; B62D 33/0273; B62D 33/03; E05B 81/04; E05B 81/78; G06K 9/00362; G06K 9/00791
See application file for complete search history.

(56) References Cited

U.S. PATENT DOCUMENTS

| | | | | |
|---|---|---|---|---|
| 9,321,395 | B2* | 4/2016 | Ammar | ............ B60R 1/12 |
| 2010/0007463 | A1* | 1/2010 | Dingman | .......... B60Q 1/2669 |
| | | | | 340/5.72 |

(Continued)

FOREIGN PATENT DOCUMENTS

| | | |
|---|---|---|
| JP | 2013117134 A1 | 6/2013 |
| KR | 20140083278 A | 7/2014 |

(Continued)

OTHER PUBLICATIONS

English machine translation of JP2013117134A1.
(Continued)

*Primary Examiner* — Hunter B Lonsberry
*Assistant Examiner* — Mathew Franklin Gordon
(74) *Attorney, Agent, or Firm* — Jason Rogers; Vichit Chea; King & Schickli, PLLC

(57) ABSTRACT

An approach activated closure entry system is provided for a motor vehicle. That system includes a proximity sensor, a projector, a power operated closure and a controller. The controller is configured to project an image onto the ground when the motor vehicle is approached by an authorized user, vary that image when the approach activated closure entry system operation is initiated and open the power operated closure in response to the authorized user stepping into the image for a predetermined period of time.

15 Claims, 6 Drawing Sheets

(56) References Cited

U.S. PATENT DOCUMENTS

| | | | | |
|---|---|---|---|---|
| 2011/0242303 A1* | 10/2011 | Giraud | ............... | E05B 81/78 |
| | | | | 348/77 |
| 2013/0157640 A1* | 6/2013 | Aycock | ............ | H04W 4/046 |
| | | | | 455/418 |
| 2014/0156112 A1* | 6/2014 | Lee | .................. | G08C 17/00 |
| | | | | 701/2 |
| 2014/0324298 A1* | 10/2014 | Reime | .................. | G01V 8/20 |
| | | | | 701/49 |
| 2015/0127193 A1* | 5/2015 | Tofilescu | ............ | E05F 15/73 |
| | | | | 701/2 |

FOREIGN PATENT DOCUMENTS

| | | |
|---|---|---|
| KR | 20150030789 A | 3/2015 |
| WO | 2013026529 A1 | 2/2013 |
| WO | 2014089696 A1 | 6/2014 |

OTHER PUBLICATIONS

English machine translation of KR20140083278A.
English machine translation of KR20150030789A.
English machine translation of WO2013026529A1.

\* cited by examiner

APPROACH ACTIVATED CLOSURE ENTRY SYSTEM FOR A MOTOR VEHICLE

TECHNICAL FIELD

This document relates generally to the motor vehicle equipment field and, more particularly, to an approach activated closure entry system that is truly hands-free.

BACKGROUND

This document relates to a new and improved approach activated closure entry system developed to be completely hands-free. Closure entry systems in the prior art typically require the operator to reach for and to press a button on a key fob or use body gestures to activate a particular closure. Unfortunately, these motions or gestures are typically difficult to complete while carrying a load in the hands or arms. In fact, such movements or gestures are not always possible to complete safely while carrying a bulky, awkward or heavy load. The approach activated closure entry system described in this document addresses and avoids these issues. As such it is very convenient to use and enhances customer satisfaction for the motor vehicle so equipped. Therefore, the approach activated closure system is a significant advance in the art.

SUMMARY

An approach activated closure entry system is provided for a motor vehicle. That approach activated closure entry system includes a proximity sensor, a projector, a power operated closure and a controller. The controller is configured to (a) project an image onto the ground when the motor vehicle is approached by an authorized user, (b) vary the image when the approach activated closure entry system operation is initiated and (c) open the power operated closure in response to the authorized user stepping into the image for a predetermined period of time.

In one possible embodiment, the controller is configured to detect activity adjacent to the closure after projecting the image on the ground and before varying the image.

In one possible embodiment, the controller is configured to initially project an image of a motor vehicle manufacturer logo onto the ground. The controller is further configured to vary the image from the motor vehicle manufacturer logo image to a footprint image to clearly indicate to the user that the approach activated closure entry system is ready to open the power operated closure in response to the user stepping into the image.

In one possible embodiment, the power operated closure includes a power operated latch and a closure drive motor that displaces the closure of the motor vehicle between a closed position and an open position.

In one possible embodiment, the controller is configured to flash the image to indicate the approach activated closure entry system is ready to open the power operated closure in response to the user stepping into the image. In still another possible embodiment, the closure is a tailgate such as found on a pickup truck.

In accordance with an additional aspect, a method is provided of automatically opening a closure of a motor vehicle by means of an approach activated closure entry system. That method may be broadly described as comprising the steps of: (a) projecting, by a projector, an image onto the ground adjacent to the closure, (b) varying, by controller, the image to indicate activation of the approach activated closure entry system and (c) opening, by controller the closure in response to an authorized user stepping into the image for a predetermined period of time.

In one possible embodiment, the method further includes detecting, by sensor, an authorized vehicle user within a predetermined distance of the motor vehicle before projecting the image. Further, the method may include detecting, by sensor, activity adjacent to the closure before varying the image.

Still further, the method may include initially projecting, by projector, a motor vehicle manufacturer logo image adjacent to the closure in response to detecting an authorized vehicle user within the predetermined distance of the motor vehicle.

Still further, the method may include the step of varying the image by changing the image from the motor vehicle manufacturer logo image to a footprint image. Alternatively or in addition, the method may include varying the image by flashing the image on the ground.

Still further, the method may include the step of changing the footprint image back to the motor vehicle manufacturer logo image after a predetermined period of time of an authorized user failing to step into the projected footprint image. Further, the method may include deactivating, by the controller, the sensor and the projector when the motor vehicle is started. Still further, the method may include projecting the image onto the ground in a position allowing the closure to fully open without contacting an individual standing in the image.

In the following description, there are shown and described several preferred embodiments of the approach activated closure entry system and its related method of operation. As it should be realized, the system and related method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the approach activated closure entry system and the related method of operation and together with the description serve to explain certain principles thereof. In the drawing figures.

Reference will now be made in detail to the present preferred embodiments of the approach activated closure entry system, examples of which are illustrated in the accompanying drawing of figures.

DETAILED DESCRIPTION

Reference is now made to drawing FIGS. 1-3d which clearly illustrate the approach activated closure entry system 10. In the illustrated embodiment, the approach activated closure entry system 10 is for a tailgate 12 of a pickup truck 14. It should be appreciated, however, that the approach activated closure entry system 10 may be utilized for other types of closures on other types of motor vehicles such as, for example, front doors, rear doors, hatches, lift gates and the like provided on all types of motor vehicles including, for example, sedans, station wagons and cross over utility vehicles and sport utility vehicles.

Figure 1:
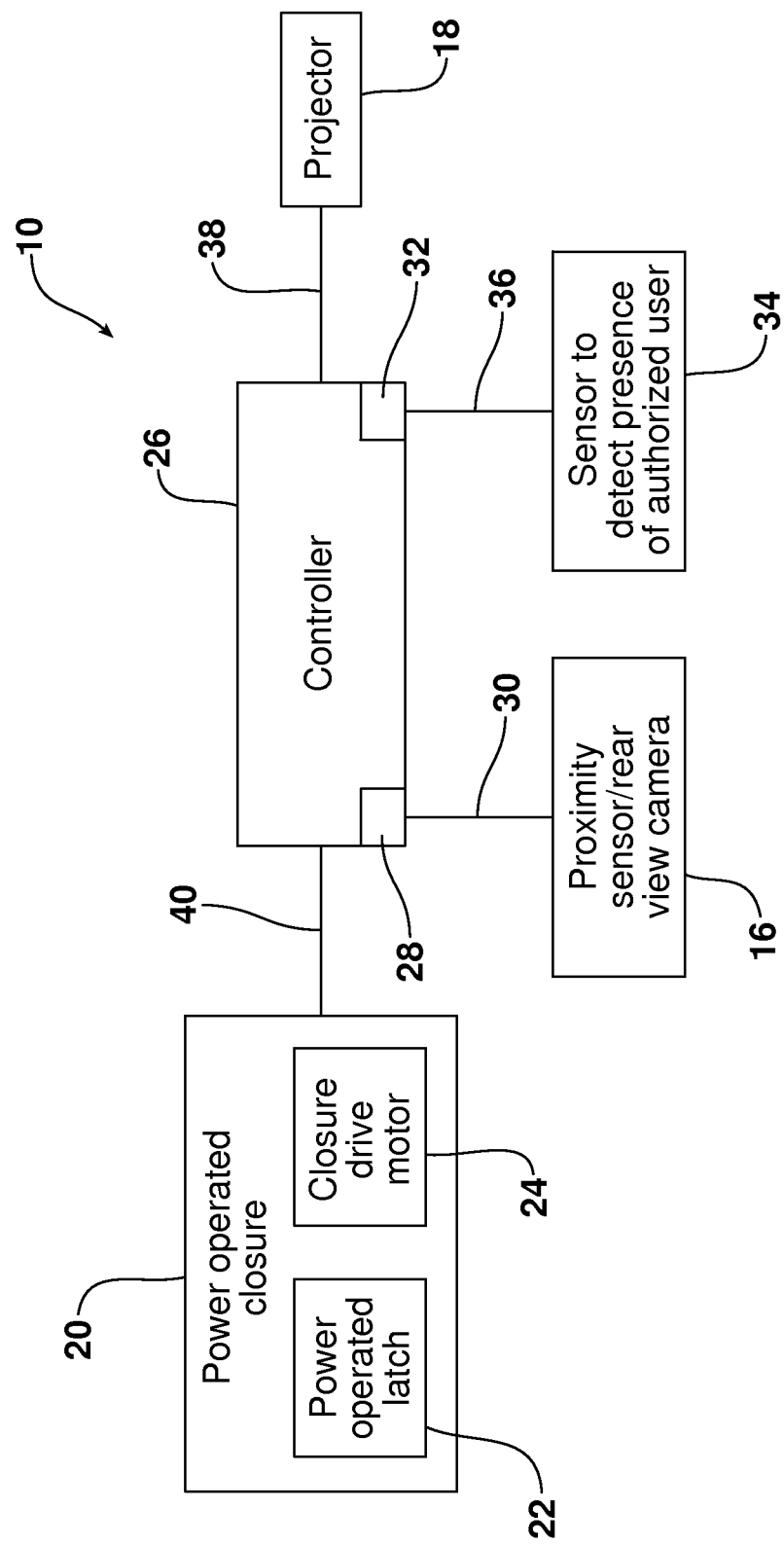
FIG. 1 is the schematic block diagram of the approach activated closure entry system.

As best illustrated in FIG. 1, the approach activated closure entry system 10 includes a proximity sensor 16, such as a digital camera, to detect activity adjacent the closure/tailgate 12. System 10 also includes a projector 18 for projecting an image onto the ground adjacent the closure/tailgate 12.

As further illustrated, the system 10 also includes a power operated closure 20. In the illustrated embodiment the power operated closure 20 includes a power operated latch 22 and a closure/tailgate drive motor 24 for opening and closing the closure/tailgate.

The approach activated closure entry system 10 also includes a controller 26 configured to operate the system. The controller 26 may comprise a computing device such as a dedicated micro processor or electronic control unit (ECU) operating on appropriate software instructions. Such a controller 26 comprises one or more processors, one or more memories and one or more network interfaces all communicating with each other over a communication bus.

As illustrated, the controller 26 includes a first data input 28 connected to the proximity sensor/camera 16 via the data line 30 and a second data input 32 connected to a sensor, ECU or other device 34 that provides data along the data line 36 respecting the presence of an authorized user approaching the motor vehicle 14.

In addition, the controller 26 is connected to the projector 18 via the control line 38. Further, the controller 26 is connected to the power operated closure system 20 via the controller on 40.

Figure 2:
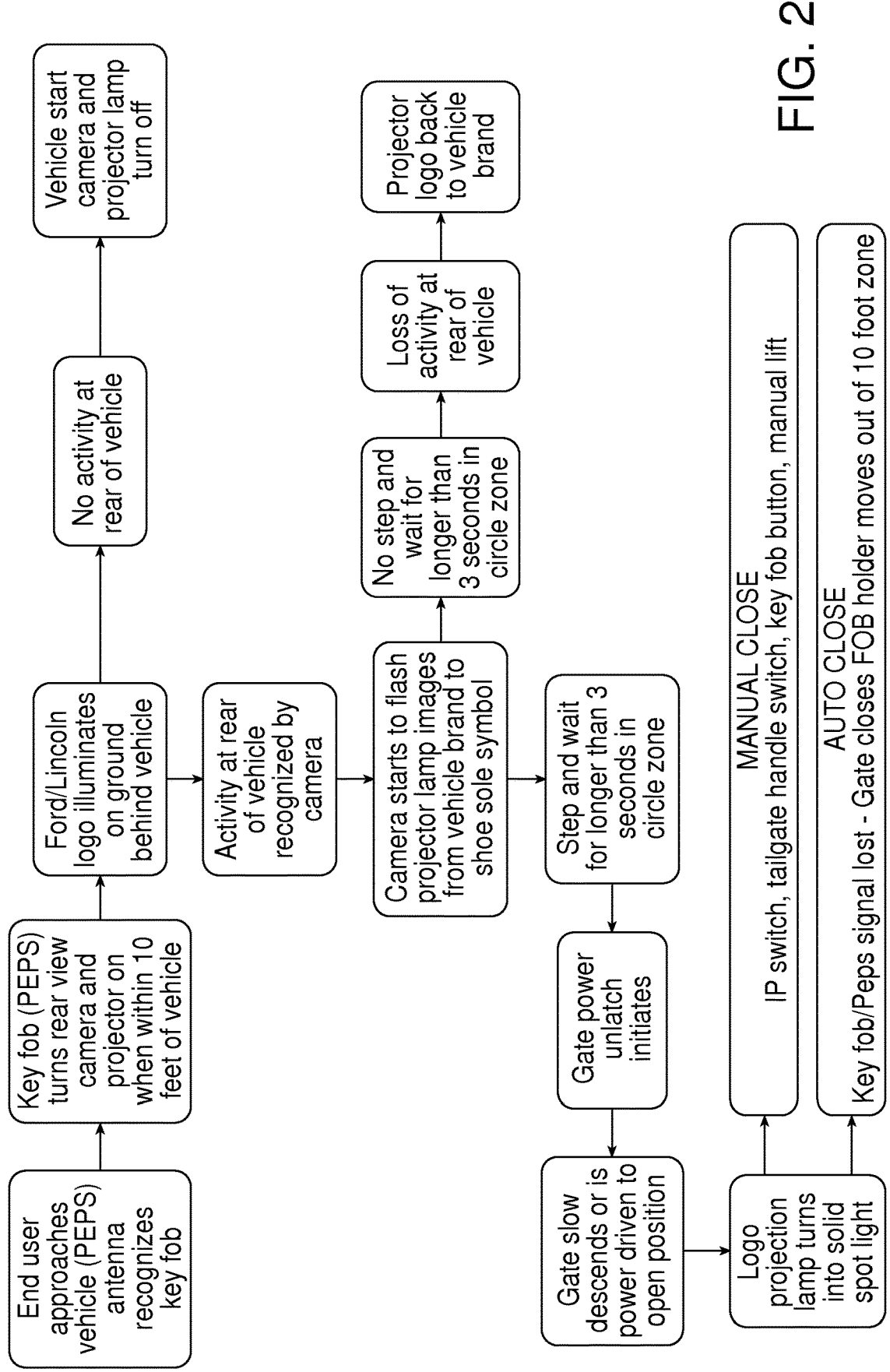
FIG. 2 is a logic diagram describing the operation of the approach activated closure entry system.

Reference is now made to FIG. 2 which is a logic diagram illustrating the operation of the approach activated closure entry system 10.

As should be appreciated from reviewing that diagram, the controller 26 of the illustrated embodiment is configured to initially project, by the projector 18, a motor vehicle manufacturer logo image 42 onto the ground G adjacent the closure/tailgate 12. See FIG. 3a. More specifically, the controller 26 does this in response to receiving a data signal from the sensor/device 34 at the data input 32 indicating detection of an authorized vehicle user within a predetermined distance of the motor vehicle 14. As should be appreciated, the projected image 42 is projected onto the ground G adjacent to the closure/tailgate 12 but sufficiently spaced therefrom to allow clearance for the closure/tailgate to fully open when individual/authorized user is standing in the projected image.

Next, the controller 26 monitors the data input 28. If and when the proximity sensor/camera 16 detects activity or movement adjacent the closure/tailgate 12, a signal is sent along the data line 30 to data input 28. In response to receiving this activity signal, the controller 26 is configured to vary the projected image 42 so as to indicate activation of the approach activated closure entry system 10. In the illustrated embodiment, the projected image is varied by changing the image from the motor vehicle manufacturer logo image 42 illustrated in FIG. 3a to a footprint image 44 illustrated in FIG. 3b. The controller 26 may also be configured to flash the footprint image 44 so as to draw the user's attention to the image.

Figure 3A:
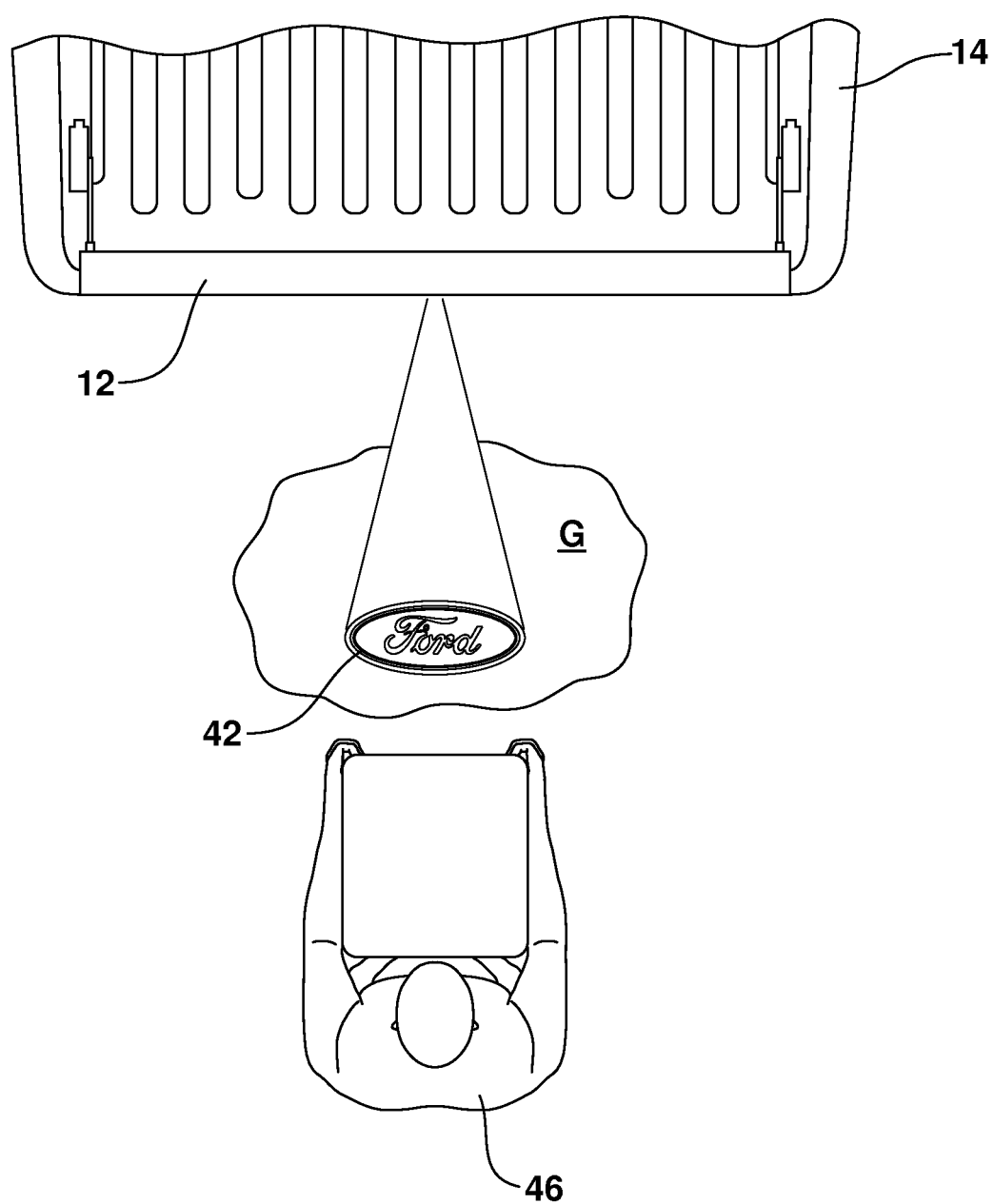
FIGS. 3a-3d are sequential top plan views illustrating the operation of the approach activated closure entry system.
Figure 3B:
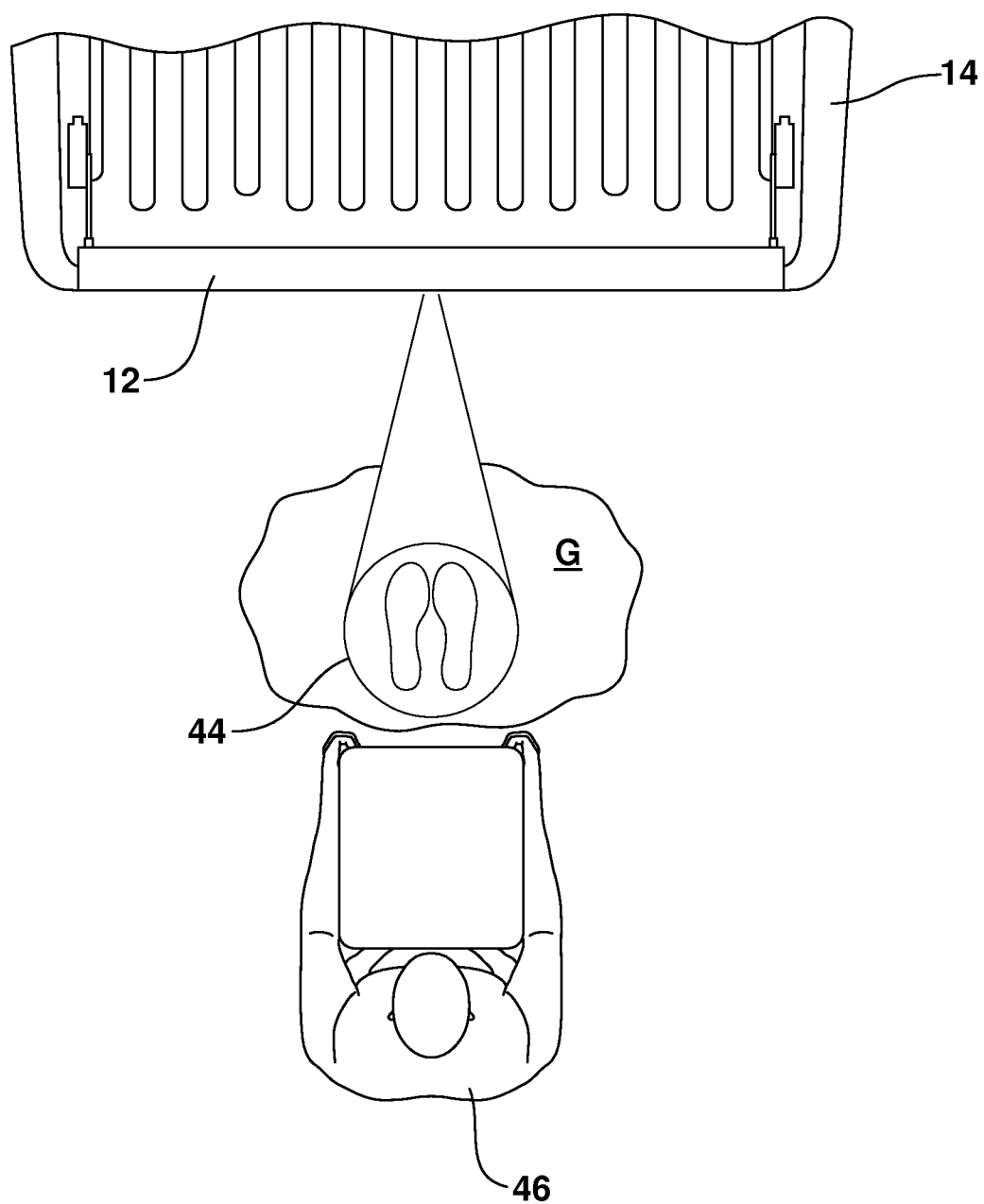
Figure 3C:
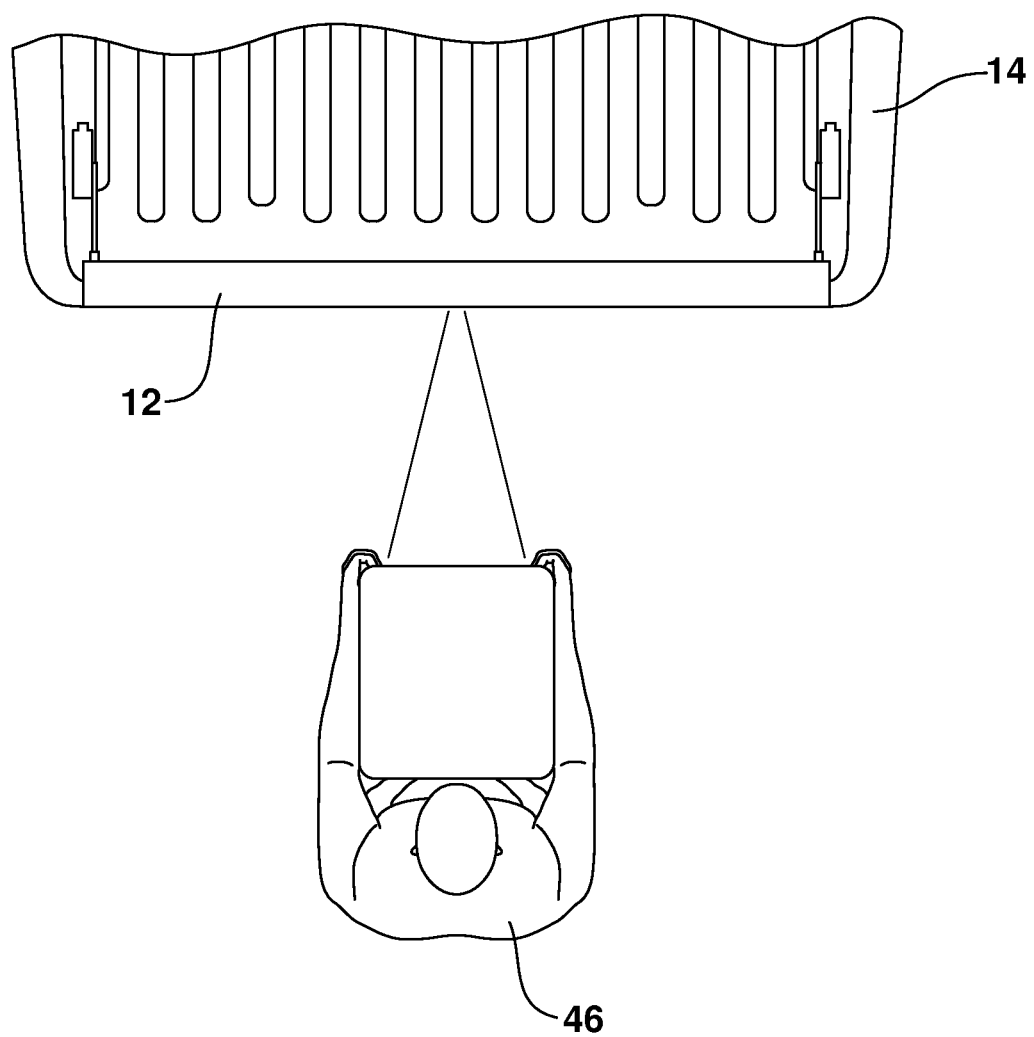
Figure 3D:
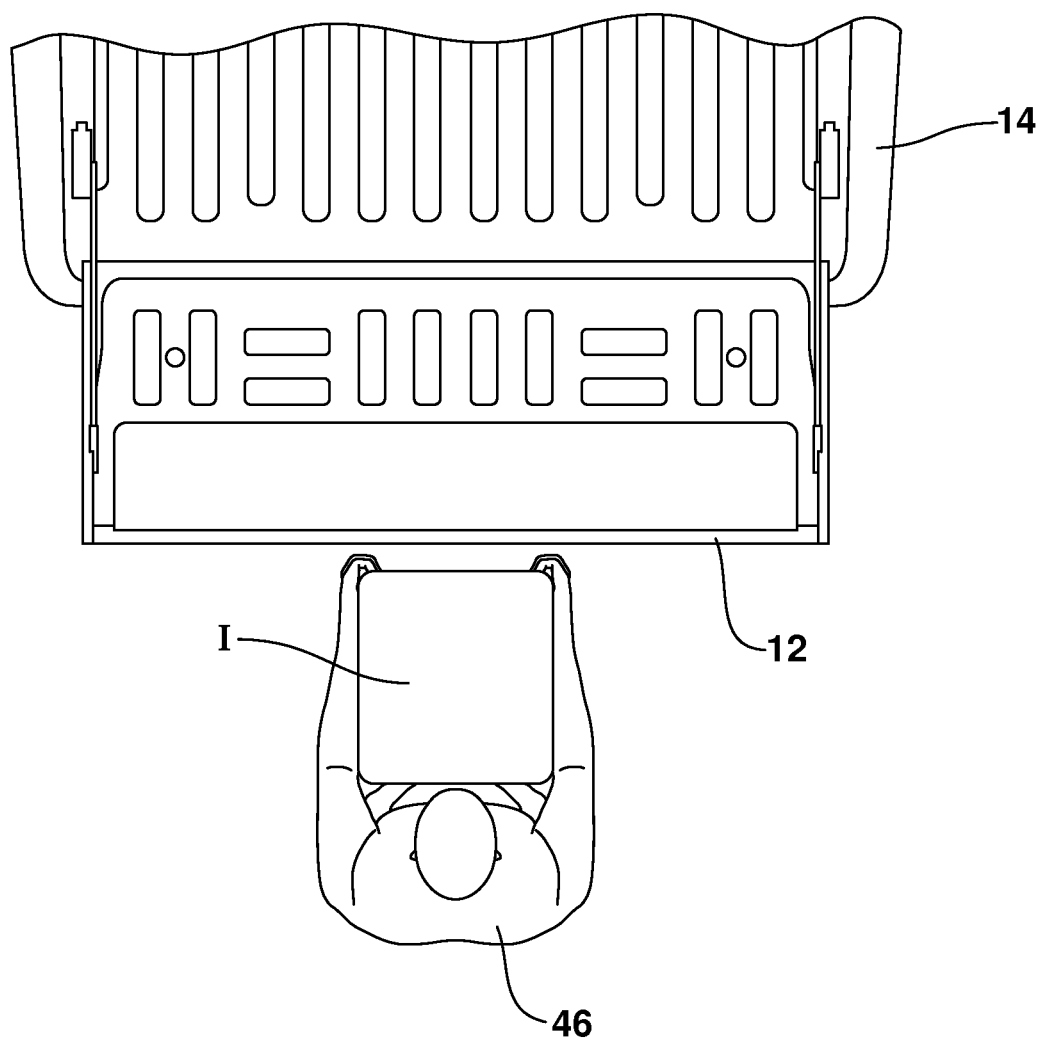

The footprint image 44 informs the authorized user that the approach activated closure entry system 10 has been activated and that the user needs to step onto the image 44 where it is projected onto the ground G in order to open the closure. Thus, as illustrated in FIG. 3c, the authorized user/individual 46 now steps forward onto the footprint image 44 being projected onto the ground G by the projector 18 and stands in that image for a predetermined period of time such as, for example, 3 to 5 seconds. Upon receipt of a data signal at the input 28 from the proximity sensor/camera 16 that the individual has stepped into the footprint image and remained there for the predetermined period of time, the controller 26 is configured to open the closure/tailgate 12. See FIG. 3d. As should be appreciated, the closure/tailgate 12 may be fully opened while the user stands on the ground G at the point where the footprint image 44 appeared. The user may then place the item I being carried onto the motor vehicle 14 through the open tailgate 12. As should be appreciated, the user 46 did not have to complete any specific gestures or body movements with the hands or arms in order to open the closure/tailgate 12. Thus, the hands remain free to simply hold the item being carried.

As should be further appreciated from viewing FIG. 2, the controller 26 is also configured to change the footprint image 44 back to the motor vehicle manufacturer logo image 42 after a predetermined period of time if an authorized user fails to step into the projected footprint image to provide a proper signal for initiating the opening of the closure/tailgate 12. Further, the controller 26 is configured to deactivate the proximity sensor/camera 16 and the projector 18 when the motor vehicle 14 is subsequently started.

In summary, the approach activated closure entry system 10 described herein provides a number of unique benefits and advantages. As should be appreciated, as configured, the system 10 is truly hands-free. The user does not need to use his hands to complete any movement or gesture in order to have the system 10 open the closure 12. Thus the hands are maintained completely free to carry any item thereby greatly benefitting the user. Further, the system 10 is completely intuitive, projecting a footprint logo image 44 onto the ground G to indicate when and where the individual is to stand in order to have the system 10 open the closure 12 in a hands-free manner. This eliminates any hesitation or guessing as to when or where to stand in order to achieve the desired result thereby enhancing the customer satisfaction with the operation of the system 10 and the overall motor vehicle 14.

The foregoing has been presented for purposes of illustration and description. It is not intended to be exhaustive or to limit the embodiments to the precise form disclosed. Obvious modifications and variations are possible in light of the above teachings. For example, in the illustrated embodiment, a projected image is changed from an image of the manufacturer's logo 42 to a footprint 44 in order to indicate activation of the system 10 and the place for the individual 46 to stand in order to initiate hands-free opening of the closure 12. It should be appreciated that other signaling is possible. For example, the image itself may not change, it may simply be flashed upon the ground to indicate when and where to stand to initiate opening of the closure. All such modifications and variations are within the scope of the appended claims when interpreted in accordance with the breadth to which they are fairly, legally and equitably entitled.

What is claimed:

1. An approach activated closure entry system for a motor vehicle, comprising:
 a proximity sensor;
 a projector;

a power operated closure;

a sensing device for detecting an authorized user within a predetermined distance of said motor vehicle; and a controller configured to (a) project an image onto the ground when said motor vehicle is approached by said authorized user, (b) change said image when said approach activated closure entry system operation is initiated and (c) open said power operated closure in response to said authorized user stepping into said image for a predetermined period of time.

2. The approach activated closure entry system of claim 1 wherein said controller is configured to detect activity adjacent said closure after projecting the image on the ground and before varying said image.

3. The approach activated closure entry system of claim 2, wherein said controller is configured to initially project an image of a motor vehicle manufacturer logo onto the ground.

4. The approach activated closure entry system of claim 3 wherein said controller is configured to vary said image from said motor vehicle manufacturer logo to a footprint to indicate said approach activated closure entry system is ready to open said power operated closure in response to said user stepping into said image.

5. The approach activated closure entry system of claim 4, wherein said power operated closure includes a power operated latch and closure drive motor for displacing the closure of said motor vehicle between a closed position and an open position.

6. The approach activated closure entry system of claim 2, wherein said controller is configured to flash said image to indicate said approach activated closure entry system is ready to open said power operated closure in response to said user stepping into said image.

7. The approach activated closure entry system of claim 1 wherein said closure is a tailgate.

8. A method of automatically opening a closure of a motor vehicle by means of an approach activated closure entry system, comprising:

projecting, by projector, an image onto the ground adjacent said closure;

detecting, by sensor, an authorized vehicle user within a predetermined distance of said motor vehicle before projecting said image;

changing, by controller, said image to indicate activation of said approach activated closure entry system; and opening, by controller, said closure in response to the authorized user stepping into said image for a predetermined period of time.

9. The method of claim 8, further including detecting, by sensor, activity adjacent said closure before varying said image.

10. The method of claim 9, including initially projecting, by said projector, a motor vehicle manufacturer logo image onto the ground adjacent said closure is response to detecting an authorized vehicle user within said predetermined distance of said motor vehicle.

11. The method of claim 10, wherein varying said image includes changing said image from said motor vehicle manufacturer logo image to a footprint image.

12. The method of claim 11, including changing said footprint image back to said motor vehicle manufacturer logo image after a predetermined period of time of an authorized user failing to step into said projected footprint image.

13. The method of claim 12, including deactivating, by said controller, said sensor and said projector when said motor vehicle is started.

14. The method of claim 8, wherein varying said image includes flashing said image on the ground.

15. The method of claim 8, including projecting said image onto said ground in a position allowing said closure to fully open without contacting an individual standing in said image.

* * * * *